US006838863B2

United States Patent
Hazucha et al.

(10) Patent No.: US 6,838,863 B2
(45) Date of Patent: Jan. 4, 2005

(54) VOLTAGE CONVERTER UTILIZING INDEPENDENTLY SWITCHED INDUCTORS

(75) Inventors: Peter Hazucha, Beaverton, OR (US); Gerhard Schrom, Hillsboro, OR (US); Tanay Karnik, Portland, OR (US); Volkan Kursun, Rochester, NY (US); Siva Narendra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 10/330,555

(22) Filed: Dec. 30, 2002

(65) Prior Publication Data

US 2004/0124826 A1 Jul. 1, 2004

(51) Int. Cl.[7] .............................. G05F 1/40; G05F 1/44
(52) U.S. Cl. ...................... 323/282; 323/272; 323/222
(58) Field of Search ................................ 323/282, 222, 323/272, 284

(56) References Cited

U.S. PATENT DOCUMENTS

| 6,023,154 | A | * | 2/2000 | Martinez | 323/272 |
| 6,424,545 | B2 | * | 7/2002 | Burton | 363/21.12 |
| 6,441,712 | B2 | * | 8/2002 | Ainsworth | 336/160 |
| 6,442,052 | B1 | * | 8/2002 | Hemena et al. | 363/97 |
| 6,686,727 | B2 | * | 2/2004 | Ledenev et al. | 323/272 |
| 6,696,823 | B2 | * | 2/2004 | Ledenev et al. | 323/272 |

\* cited by examiner

*Primary Examiner*—Bao Q. Vu
(74) *Attorney, Agent, or Firm*—Fleshner & Kim, LLP

(57) ABSTRACT

Embodiments of the present invention relate to independently switched inductors in a voltage converter. Each voltage transforming inductor of a voltage converter may be deignated a switch or bridge at each opposing terminal. The function of these switches is to periodically reverse the polarity of voltage across the inductors. By configuring independently switched inductors in series, the frustration of voltage tolerance limitations of the switches is mitigated.

36 Claims, 16 Drawing Sheets

US 6,838,863 B2

VOLTAGE CONVERTER UTILIZING INDEPENDENTLY SWITCHED INDUCTORS

BACKGROUND OF THE INVENTION

1. Field of the Invention

The field of the invention generally relates to electronics.

2. Background of the Related Art

Electronics are very important in the lives of many people. In fact, electronics are present in almost all electrical devices (e.g. radios, televisions, toasters, and computers). Many times electronics are virtually invisible to the user because they can be made up of very small devices inside a case. Although electronics may not be readily visible, they can be very complicated. It may be desirable in many electrical devices for the electronics to become smaller and smaller. This may be desirable, as smaller devices are more portable and convenient to use by a user. Additionally, smaller electronic devices may actually work better as they are miniaturized (e.g., work faster or more efficiently).

DETAILED DESCRIPTION OF PREFERRED EMBODIMENTS

Electrical hardware (e.g. a computer) may include many electrical devices. In fact, a computer may include millions of electrical devices (e.g. transistors, resistors, and capacitors). These electrical devices must work together in order for hardware to operate correctly. Accordingly, electrical devices of hardware may be electrically coupled together. This coupling may be either direct coupling (e.g. direct electrical connection) or indirect coupling (e.g. electrical communication through a series of components).

Figure 1:
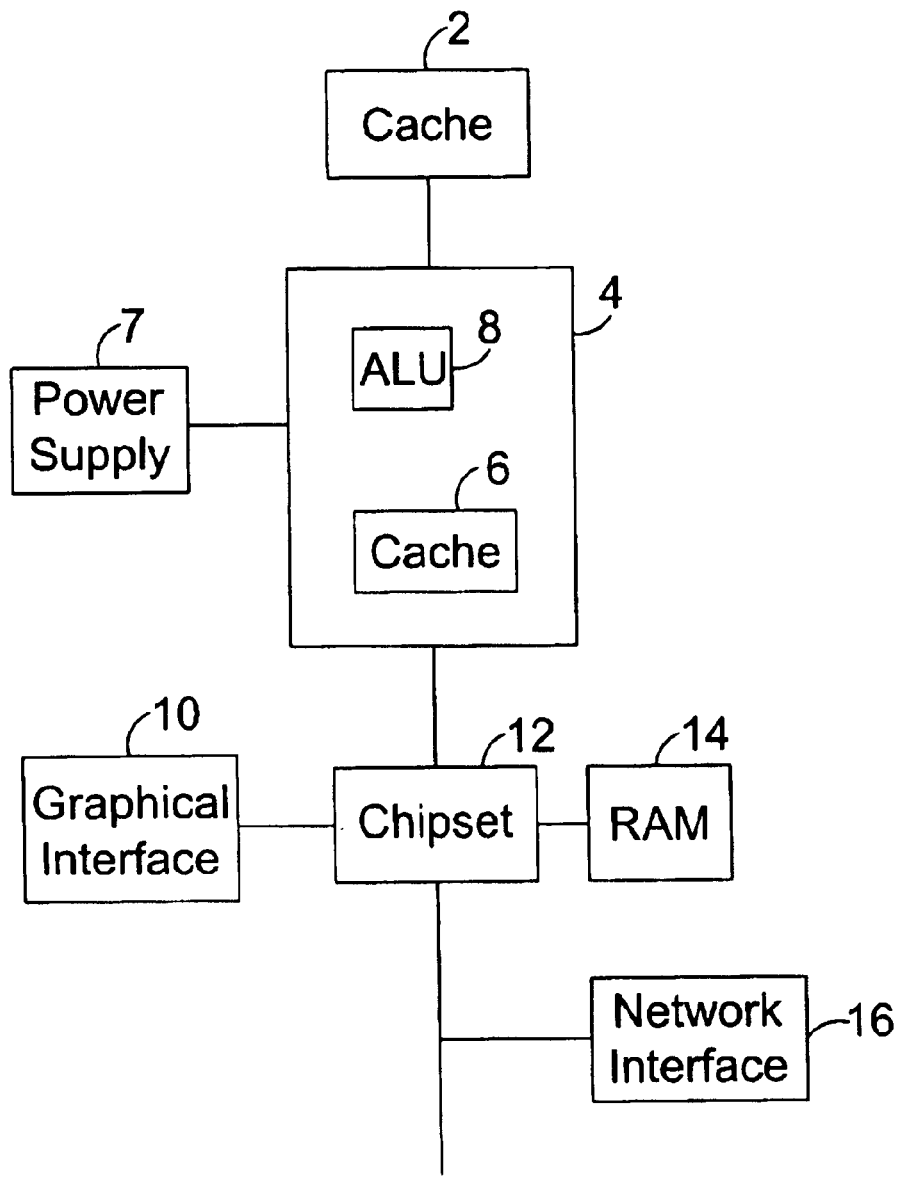
FIG. 1 is an exemplary global diagram of a portion of a computer.

FIG. 1 is an exemplary global illustration of a computer. The computer may include a processor 4, which acts as a brain of the computer. Processor 4 may be formed on a die. Processor 4 may include an Arithmetic Logic Unit (ALU) 8 and may be included on the same die as processor 4. ALU 8 may be able to perform continuous calculations in order for the processor 4 to operate. Processor 4 may include cache memory 6 which may be for temporarily storing information. Cache memory 6 may be included on the same die as processor 4. The information stored in cache memory 6 may be readily available to ALU 8 for performing calculations. A computer may also include an external cache memory 2 to supplement internal cache memory 6. Power supply 7 may be provided to supply energy to processor 4 and other components of a computer. A computer may include a chip set 12 coupled to processor 4. The chip set 12 may intermediately couple processor 4 to other components of the computer (e.g. graphical interface 10, Random Access Memory (RAM) 14, and/or a network interface 16). One exemplary purpose of chip set 12 is to manage communication between processor 4 and these other components. For example, graphical interface 10, RAM 14, and/or network interface 16 may be coupled to chip set 12.

Power supply 7 may output a different voltage level than an operating voltage level of processor 4. Accordingly, voltage converter may be utilized on or proximate to the processor to transform a voltage level of the power supply to an operating voltage level of processor 4. As one of ordinary skill in the art would appreciate, voltage converters may be implanted in other hardware configurations.

Figure 2A:
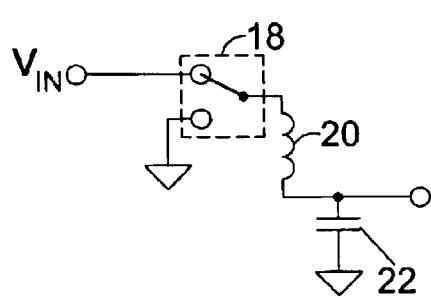
FIGS. 2A, 2B, 3A, 3B, 4A, and 4B are exemplary diagrams of voltage converters.
Figure 2B:
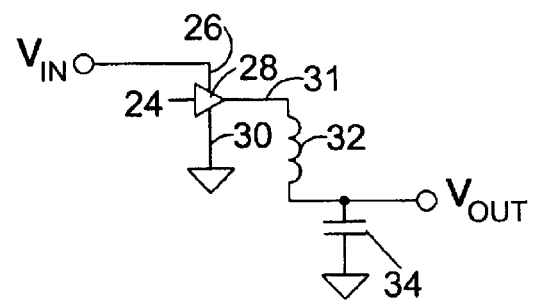

FIGS. 2A and 2B illustrate buck DC—DC converters. The buck DC—DC converters may receive an input voltage $V_{in}$ and output an output voltage $V_{out}$. The voltage converters illustrated in FIGS. 2A and 2B may each include an inductor [20 or 32] and a capacitor [22 or 34] connected in series. FIG. 2A illustrates switch 18 with an output coupled to inductor 20. Inductor 20 and capacitor 22 may be coupled in series. Inputs of switch 18 may receive $V_{in}$ and a ground voltage. Capacitor 22 may be connected to ground. $V_{out}$ may be connected at the interface of capacitor 22 and inductor 20.

FIG. 2B illustrates bridge 28 with output 31 coupled to inductor 32. Inductor 32 and capacitor 34 may be connected in series. Bridge 28 may receive $V_{in}$ at first input 26 and may receive a ground voltage at second input 30. Bridge 28 may include control input 24. A voltage output $V_{out}$ may be drawn at an interface of inductor 32 and capacitor 34. In the exemplary illustrations of FIGS. 2A and 2B, switch 18 [or bridge 28] may periodically switch between inputting $V_{in}$ and inputting ground. Accordingly, when switch 18 [or bridge circuit 28] is switched to $V_{in}$, inductor 20 [or inductor 32] is connected between $V_{in}$ and $V_{out}$. Likewise, when switch 18 [or bridge 28] is switched to ground, inductor 20 [or inductor 32] is connected between ground and $V_{out}$. Capacitor 22 [or capacitor 34] may be an output filter for $V_{out}$. The structure illustrated in FIG. 2B may be a particular application of a bridge as a switch. In the operation of the examples illustrated in FIGS. 2A and 2B, $V_{out}$ can be arranged to output a voltage between 0 volts (ground) and $V_{in}$, depending on the switching of switch 18 [or bridge 28].

Bridge 28 may include a plurality of electrical devices (e.g. diodes and/or transistors). As illustrated in FIG. 2B, bridge 28 may include control input 24, first input 26, second input 30, and output 31. Output 31 may receive either first input 26 or second input 30, depending on a control signal input to control input 24. In other words, based on the selectivity of control input 24, bridge 28 is switched to either first input 26 or second input 30.

Switches and bridges do have tolerances. For example, the voltage difference between first input 26 and second input 30 cannot exceed a maximum voltage tolerance $V_{max}$ of a given bridge. $V_{max}$ may be determined based on material characteristics of a switch [or a bridge] and/or the configuration of electrical components of a switch [or a bridge]. In this example, if $V_{max}$ is exceeded, then bridge 28 will not operate correctly and a hardware device including bridge 28 may not work.

For example, if $V_{max}$=2V, then a voltage difference between first input 26 and second input 30 must be less than 2V. In this example, assuming that ground is 0V, $V_{in}$ must be less than 2V if $V_{max}$=2V.

As another example, if $V_{max}$ is routinely exceeded, the lifetime over which bridge 28 may be dependable, may be unnecessarily shortened. In other words, although bridge 28 may initially operate correctly, bridge 28 may eventually exhibit temporary or permanent failure if $V_{max}$ is exceeded for a period of time.

Figures 3A, 3B:
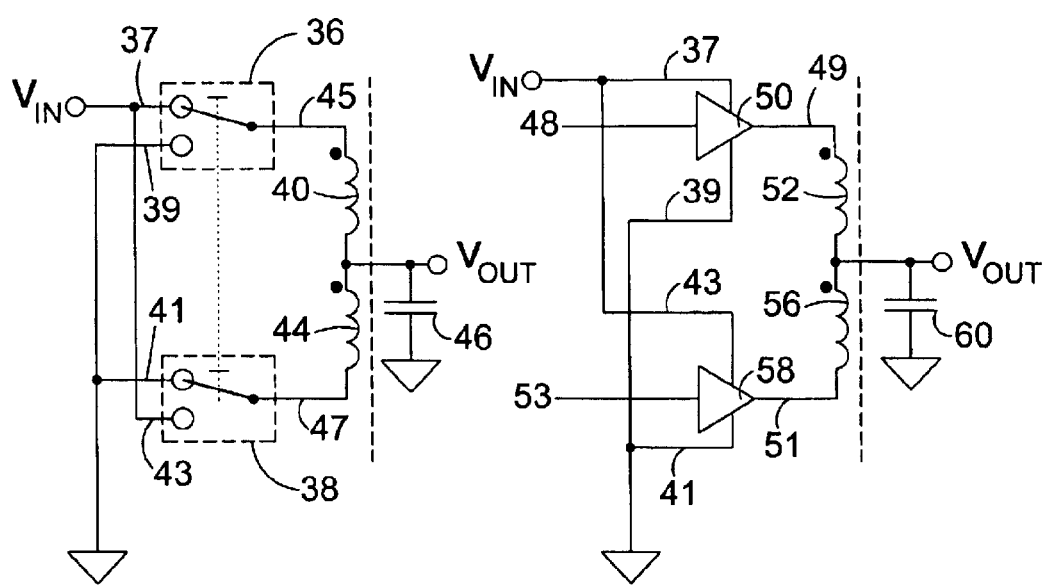

FIGS. 3A and 3B illustrate exemplary voltage converters that utilize autotransformers. The voltage converters may be DC—DC converters. The examples illustrated in FIGS. 3A and 3B each include a first inductor [40 or 52], a second inductor [44 or 56], and capacitor [46 or 60]. Capacitor [46 or 60] may be coupled at the interface of first inductor [40 or 52] and second inductor [44 or 56]. Additionally, the examples illustrated in FIGS. 3A and 3B include first switch 36 [or first bridge 50] and second switch 38 [or second bridge 58]. In FIG. 3A, first switch 36 receives $V_{in}$ at input 37 and receives a ground voltage at input 39. Second switch 38 receives $V_{in}$ at input 43 and receives ground voltage at input 41. Switch 36 selects either input 37 or input 39 to be connected to output terminal 45. Likewise, switch 38 selects either input 41 or input 43 to be outputted at output terminal 47.

In FIG. 3B, bridge 50 receives $V_{in}$ at input terminal 37 and receives a ground voltage at input terminal 39. Accordingly, bridge 50 outputs either $V_{in}$ or ground at output terminal 49 in accordance with a control signal inputted into control terminal 48. Likewise, bridge 58 receives $V_{in}$ at input terminal 41 and ground at input terminal 43. Bridge 58 may output at output terminal 51 either $V_{in}$ or ground depending on the input signal at control terminal 53. Input terminal 37 and input terminal 43 may be coupled together, as both receive $V_{in}$. Likewise, input terminal 39 and input terminal 41 may be coupled together, as both receive the ground voltage. The structure illustrated in FIG. 3B is a particular application of a bridge as a switch.

One exemplary purpose of switches [36, 38] or bridges [50, 58] is to prevent saturation of inductors 40, 44, 52, and 56 during operation of a voltage converter. First inductor [40 or 52] and second inductor [44 or 56] may have the same inductance value. If first inductor [40 or 52] and second inductor [44 or 56] have the same inductance value, then the magnitude of $V_{out}$ will be approximately half the magnitude of $V_{in}$. Likewise, the current at $V_{out}$ will be approximately twice the current of $V_{in}$. In this arrangement, first inductor [40 or 52] and second inductor [44 or 56] may operate as a voltage divider. First inductor [40 or 52] and second inductor [44 or 56] are both electrically coupled and magnetically coupled. Accordingly, power supplied at $V_{in}$ is substantially output at $V_{out}$ with a reduced voltage and an increased current.

In embodiments, the polarity of voltage across first inductor [40 or 52] and second inductor [44 or 56] must be periodically reversed to avoid magnetic saturation of inductors 40, 44, 52, and 56. In embodiments, the polarity of voltage across first inductor [40 or 52] and second inductor [44 or 56] must be periodically reversed to limit the magnitude of current passing through first inductor [40 or 52] and/or second inductor [44 or 56]. Accordingly, switches [36, 38] or bridges [50, 58] may be arranged to periodically change polarity of voltage across first inductor [40 or 52] and second inductor [44 and 56]. This is accomplished by switches [36, 38] or bridges [50, 58] being switched substantially in tandem. Additionally, output terminal 45 of first switch 36 [or output terminal 49 of first bridge 50] and output terminal 47 of second switch 38 [or output terminal 51 of second bridge 58] are never connected to $V_{in}$ or ground at the same time. During this periodic switching in tandem and because first inductor [40 or 52] and second inductor [44 or 56] have the same inductance value, the voltage level of the mid point (which is directly connected to $V_{out}$) remains at the same voltage level throughout switching. Periodic switching must occur to prevent first inductor [40 or 52] and second inductor [44 and 56] from being saturated with energy and unable to perform a voltage conversion function. The frequency of the periodic switching of the inductors is dependent on the size of the inductors. Smaller inductors require more frequent switching, as saturation of these inductors occurs more quickly and must be prevented by reversing the polarity of voltage. In embodiments of the present invention, the frequency of switching may be between 1 Hz and 10 Ghz.

Problems do exist in the exemplary configurations illustrated in FIGS. 3A and 3B. For example, because each switch [36, 38] or bridge [50, 58] is connected to both $V_{in}$ and ground, $V_{in}$ is limited to the maximum operating voltage ($V_{max}$) of each switch [36, 38] or each bridge [50, 58]. Accordingly, more costly switches or bridges must be utilized to convert relatively high voltages (over $V_{max}$) to lower voltages. Another limitation with the arrangements illustrated in FIGS. 3A and 3B is that $V_{out}$ is limited to half the voltage of $V_{in}$. To maintain a constant level of $V_{out}$ and avoid saturation of first inductor [40 or 52] and second inductor [40 or 56] by periodic switching, $V_{out}$ must be half the voltage magnitude of $V_{in}$. These limitations may frustrate the ability to down convert a voltage at a reasonable cost.

Figure 4A:
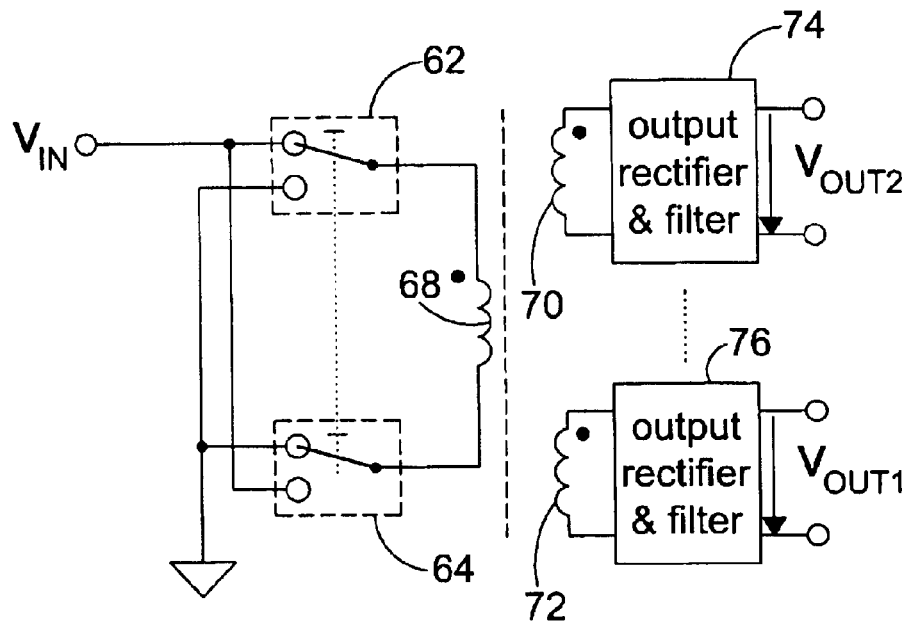
Figure 4B:
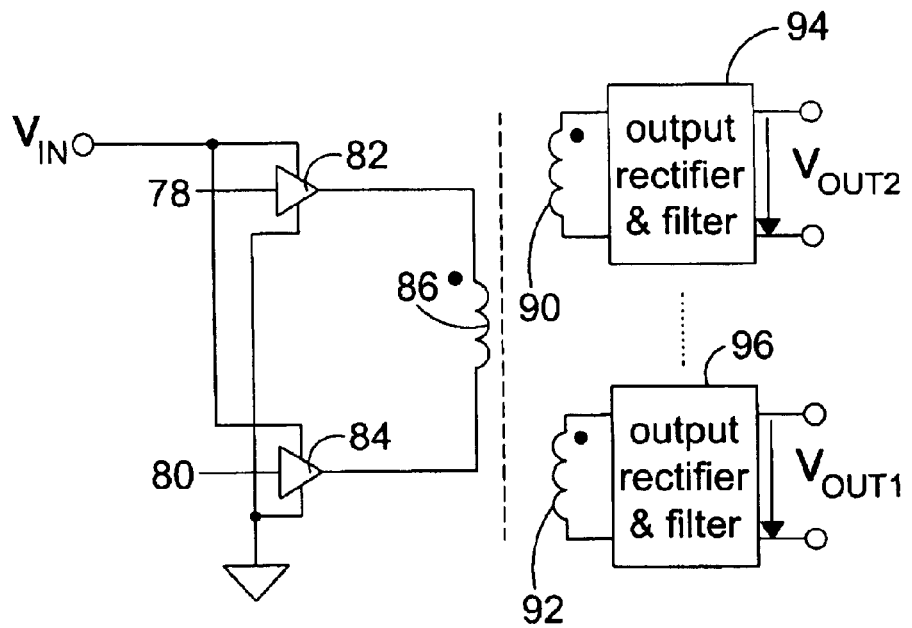

FIGS. 4A and 4B illustrate an example of a voltage converter with multiple output windings. In these arrangements, switches [62, 64] operate similar to switches [36, 38] of FIG. 3A. Similarly, bridges [82, 84] operate similar to bridges [50, 58] of FIG. 3B. However, only a single inductor [68 or 86] is between an output terminal of first switch 62 [or first bridge 82] and second switch 64 [or second bridge 84]. The output voltages [$V_{out2}$ and/or $V_{out1}$] are not electrically coupled to the single inductor [68 or 86]. $V_{out1}$ is electrically coupled (through output rectifier and filter [76 or 96]) to output inductor [72 or 92]. Likewise, $V_{out2}$ is electrically coupled (through output rectifier and filter [74 or 94]) to output inductor [70 or 90]. Similar limitations exist in the exemplary arrangements illustrated in FIGS. 4A and 4B as the exemplary arrangements illustrated in FIGS. 3A and 3B. For instance, $V_{in}$ will be limited to the $V_{max}$ of each switch [62, 64] or each bridge [82, 84].

Figure 5B:
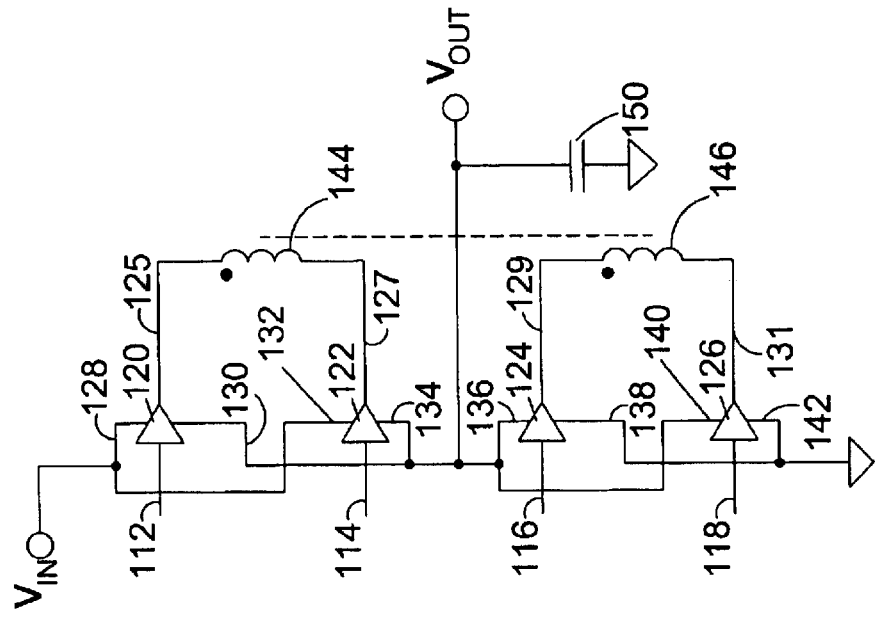
FIGS. 5A, 5B, 6A, 6B, 7A, 7B, 8A, 8B, 9A, 9B, 10A, 10B, 11A, and 11B are exemplary diagrams of voltage converters including at least two inductors that are independently switched.
Figure 5A:
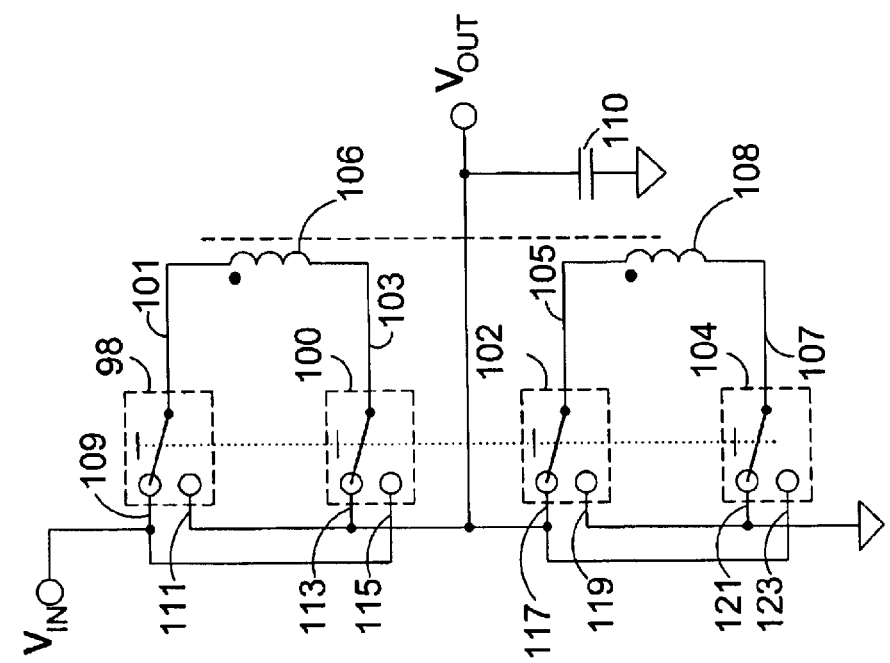

FIGS. 5A and 5B are exemplary illustrations of embodiments of the present invention. The arrangements of FIGS. 5A and 5B include first inductor [106 or 144] and second inductor [108 or 146]. First inductor [106 or 144] is connected between a first output terminal [101 or 125] of first switch 98 [or first bridge 120] and a second output terminal [103 or 127] of second switch 100 [or second bridge 122]. Likewise, second inductor [108 or 146] is connected between third output terminal [105 or 129] of third switch 102 [or bridge 124] and fourth output terminal [107 or 131] of fourth switch 104 [or fourth bridge 126]. $V_{in}$ may be connected to first input [109 or 128] and first input [115 or 132]. $V_{out}$ may be connected to first input [117 or 136] and first input [123 or 140]. In embodiments, $V_{out}$ may also be connected to second input [111 or 130] and second input [113 or 134]. Second input [119 or 138] and second input [121 or 142] may be connected to ground. First input [109 or 128] and second input [111 or 130] may be inputs to first switch 98 [or first bridge 120]. First input [115 or 132] and second input [113 or 134] may be inputs of second switch 100 [or second bridge 122]. First input [117 or 136] and second input [119 or 138] may be inputs of third switch 102 [or third bridge 124]. First input [123 or 140] and second input [121 or 142] may be inputs of fourth switch 104 [or fourth bridge 126]. Capacitor 110 and capacitor 150 may be arranged as an output filter.

In the exemplary arrangements illustrated in FIGS. 5A and 5B, first inductor [106 or 144] and second inductor [108 or 146] are independently switched. Additionally, first inductor [106 or 144] and second inductor [108 or 146] are both electrically coupled and magnetically coupled. This arrangement may allow for voltage conversion. These exemplary arrangements are advantageous, as voltages across switches or bridges can be kept below $V_{max}$ of the switches or bridges. Accordingly, $V_{in}$ will not be limited to $V_{max}$. For example, $V_{max}$=1.5V for bridge 120, $V_{in}$=2V, and $V_{out}$=1V. Accordingly, the voltage difference between first input terminal 128 (e.g. 2V) and second input terminal 130 (e.g. 1V) is 1V. Accordingly, the voltage difference across bridge 120 (e.g. 1V) is less than the $V_{max}$ of bridge 120 (e.g. 1.5V). Accordingly, the tolerances of bridges will not limit $V_{in}$ to be less than 1.5V (which is the exemplary value of $V_{max}$).

In embodiments, first switch 98 and second switch 100 switch periodically and switch substantially in tandem to avoid saturation of first inductor 106. Likewise is true for first switch 102 and fourth switch 104 with second inductor 108, first bridge 120 and second bridge 122 with first inductor 144, and/or first bridge 124 and second bridge 126 with second inductor 146. Embodiments of the present invention are advantageous, as the voltage difference between $V_{in}$ and ground is not limited by the value of $V_{max}$ of switches or bridges. It may be advantageous that less costly switches or bridges, having a relatively low $V_{max}$, may be implemented to reduce costs and/or physical size. In embodiments, different voltage outputs may be coupled to different input terminals of switches or bridges [98, 100, 102, 104, 120, 122, 124, and/or 126].

Figure 6A:
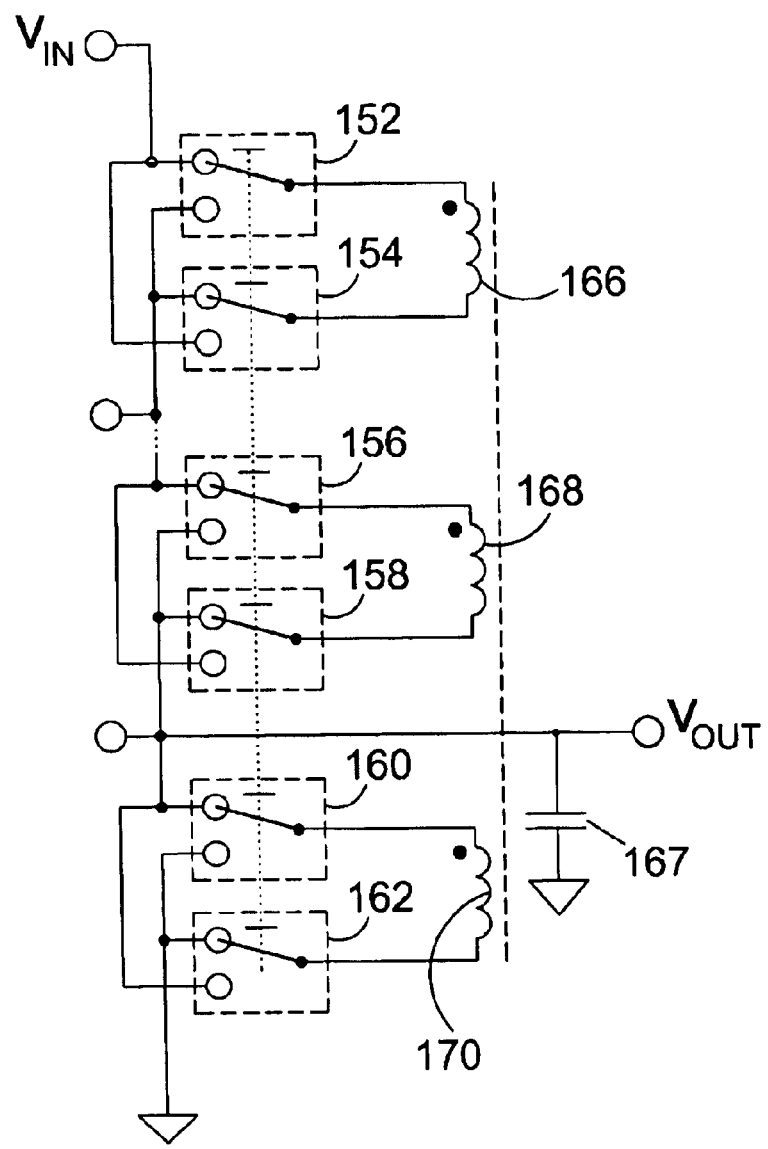
Figure 6B:
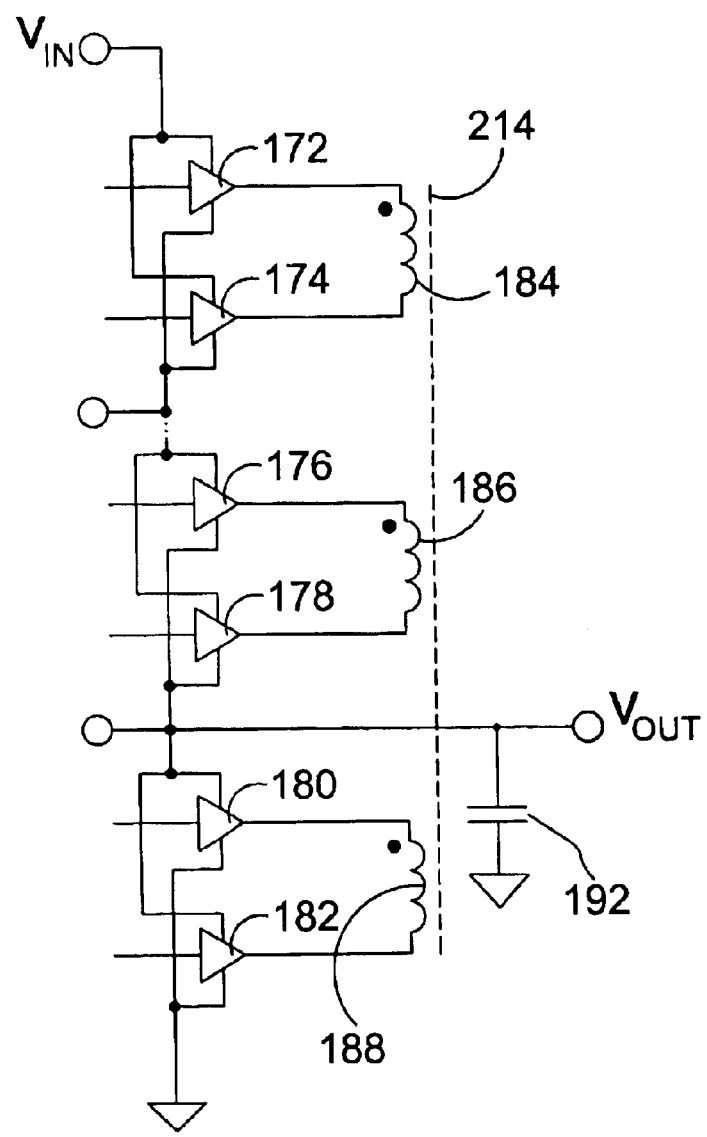

In embodiments, more than two independently switched inductors may be both electrically and magnetically coupled in a circuit. FIGS. 6A and 6B are exemplary illustration of some of these embodiments. In FIGS. 6A and 6B, first inductor [166 or 184], second inductor [168 or 186], and third inductor [170 or 188] are all electrically and magnetically coupled. Additionally, first inductor [166 or 184], second inductor [168 or 186], and third inductor [170 or 188] are each independently switched. First inductor 166 is independently switched by first switch 152 and second switch 154 in a similar manner that first inductor 106 of FIG. 5A is independently switched by first switch 98 and second switch 100. Likewise is true for third switch 156 and fourth switch 158 with second inductor 168 and/or fifth switch 160 and sixth switch 162 with third inductor 170. One of ordinary skill in the art would appreciate that more than three independently switched inductors may be implemented.

First inductor 184 may be independently switched by bridge 172 and bridge 174 in a similar manner as first inductor 144 of FIG. 5B with bridge 120 and bridge 122. Likewise is true for the switching of second inductor 186 with third bridge 176 and fourth bridge 178 and third inductor 188 with fifth bridge 180 and sixth bridge 182. One of ordinary skill in the art would appreciate that additional independently switched inductors could be added to the circuits illustrated in FIGS. 6A and 6B according to the tolerances of the bridges and the input and output voltages. In embodiments, $V_{out}$ may be coupled to any of the input terminals of switches or bridges [152, 154, 156, 158, 160, 162, 172, 174, 176, 178, 180, and/or 182]. In embodiments, different voltage outputs may be coupled to different input terminals of switches or bridges [152, 154, 156, 158, 160, 162, 172, 174, 176, 178, 180, and/or 182].

Figure 7A:
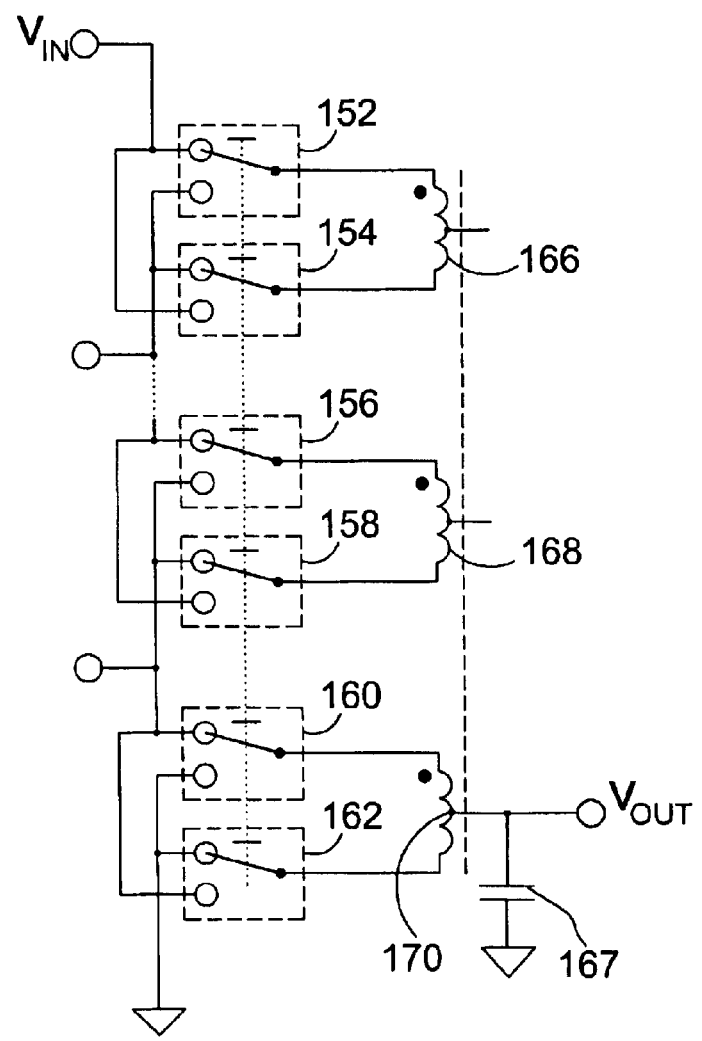
Figure 7B:
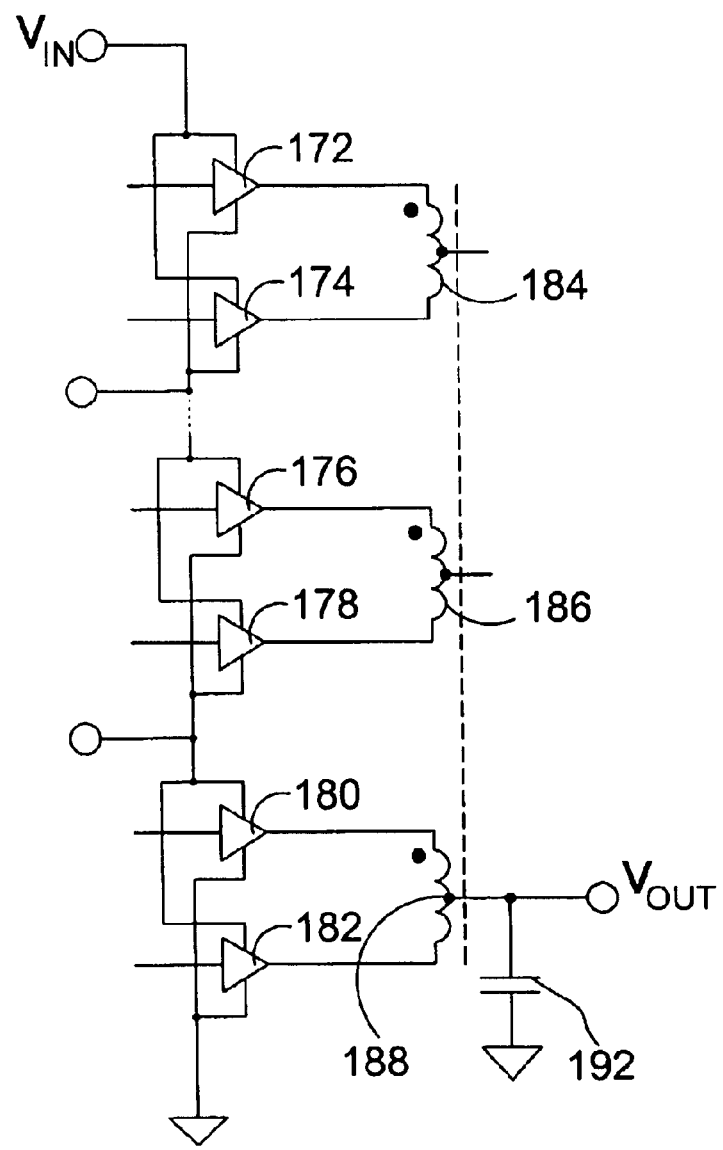

FIGS. 7A and 7B illustrate embodiments of the present invention wherein $V_{out}$ is connected to the middle of an inductor. The embodiments illustrated in FIG. 7A are similar to the embodiments illustrated in FIG. 6A. Likewise, the embodiments illustrated in FIG. 7B are similar to the embodiments illustrated in 6B. However, in the embodiments illustrated in FIGS. 7A and 7B, $V_{out}$ is connected to the center of third inductor [170 or 188]. Accordingly, $V_{out}$ is equal to one half of the voltage swing across third inductor 170 or 188. Some of these embodiments may be advantageous, as $V_{out}$ may not necessarily need to be limited to an increment of a voltage swing across an independently switched inductor. Accordingly, the resolution of voltage of $V_{out}$ can be refined to half of a voltage swing across a particular independently switched inductor. In embodiments, $V_{out}$ may be coupled to any center of any inductor [166, 168, 170, 184, 186, or 188]. In embodiments, different voltage outputs may be coupled to the center of different inductors [166, 168, 170, 184, 186, or 188].

Figure 8A:
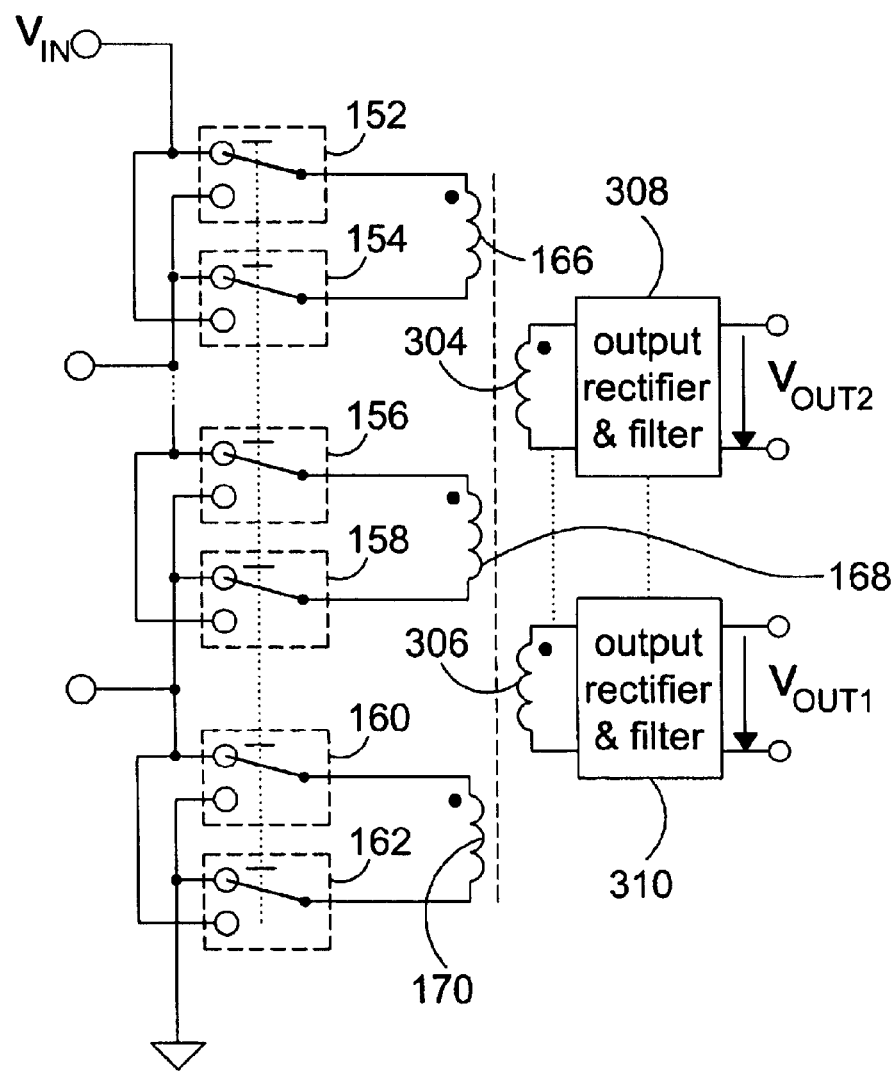
Figure 8B:
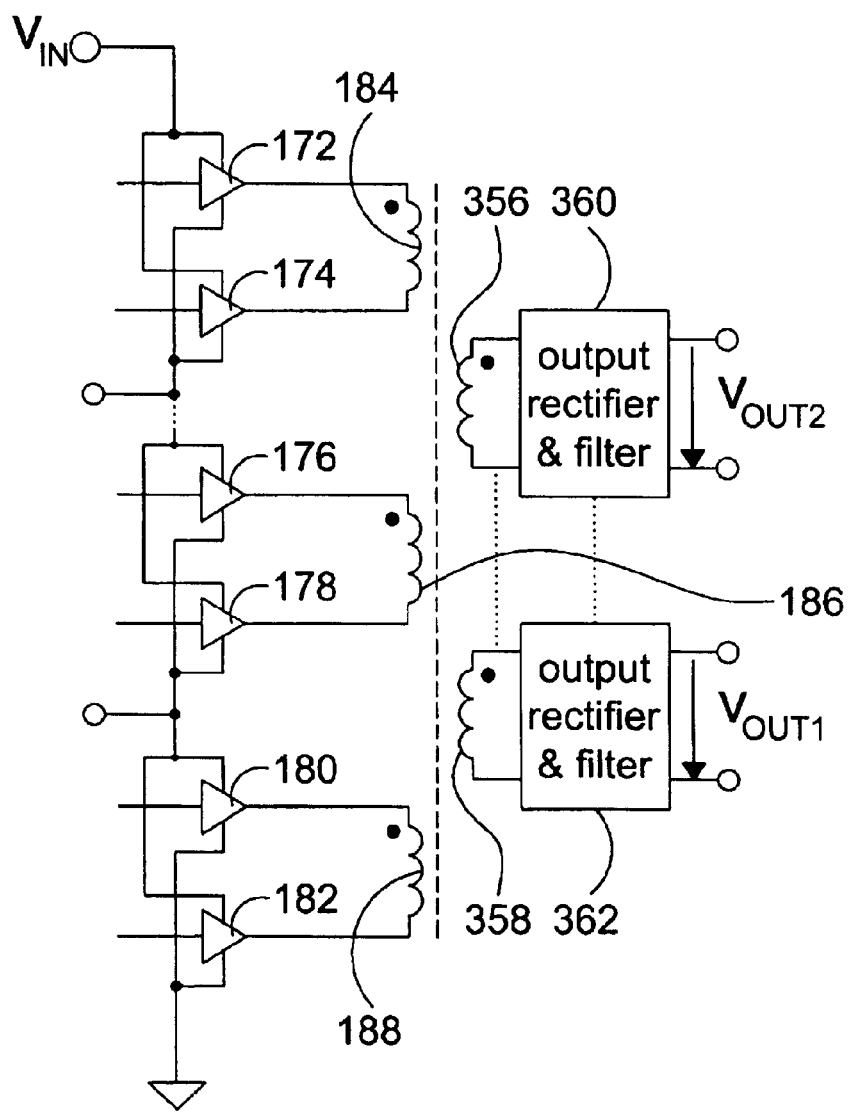

Embodiments of the present invention are exemplarily illustrated in FIGS. 8A and 8B. These embodiments may be similar to the embodiments illustrated in FIGS. 6A and 6B. In the embodiments exemplarily illustrated in FIGS. 8A and 8B, $V_{out1}$ may be electrically coupled to output inductor [306 or 358] through output rectifier and filter [310 or 362]. Output inductor 306 may be magnetically coupled to at least one of first inductor [166 or 184], second inductor [168 or 186], and third inductor [170 or 188]. As illustrated in FIGS. 8A and 8B, additional outputs (e.g. $V_{out2}$) may be implemented. For example, $V_{out2}$ may be implemented with second output inductor [304 or 356] and output rectifier and filter [308 or 360].

Figure 9B:
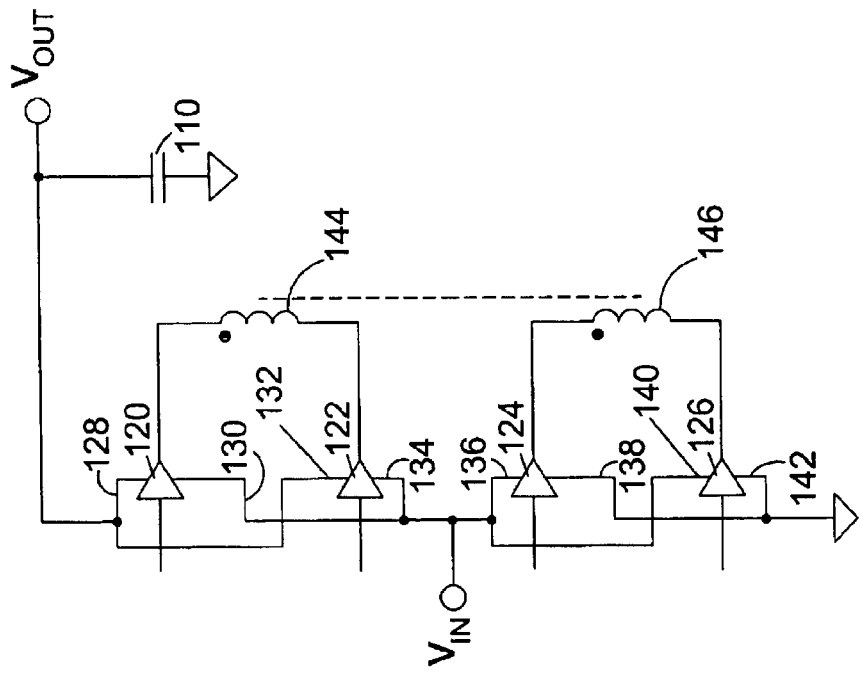
Figure 9A:
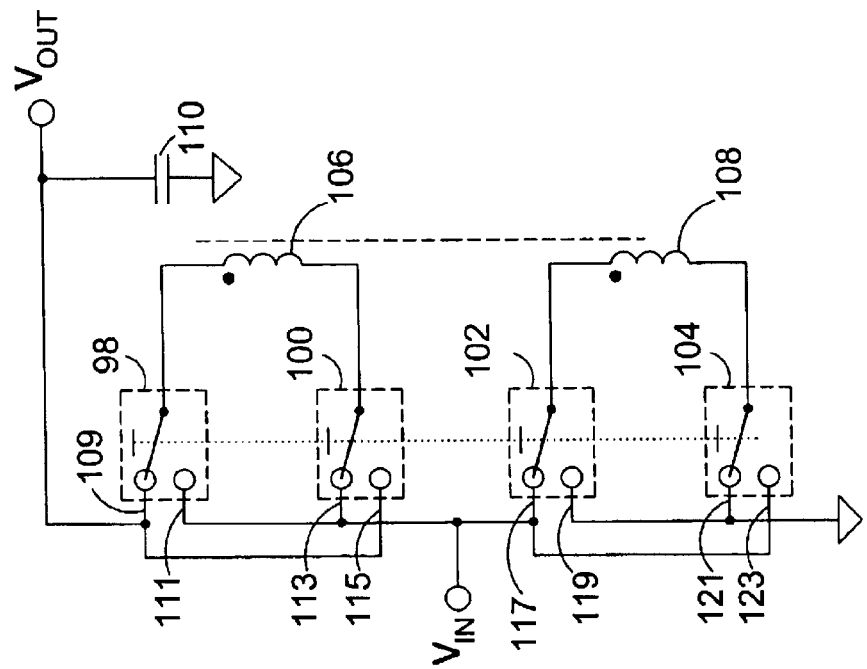
Figure 10A:
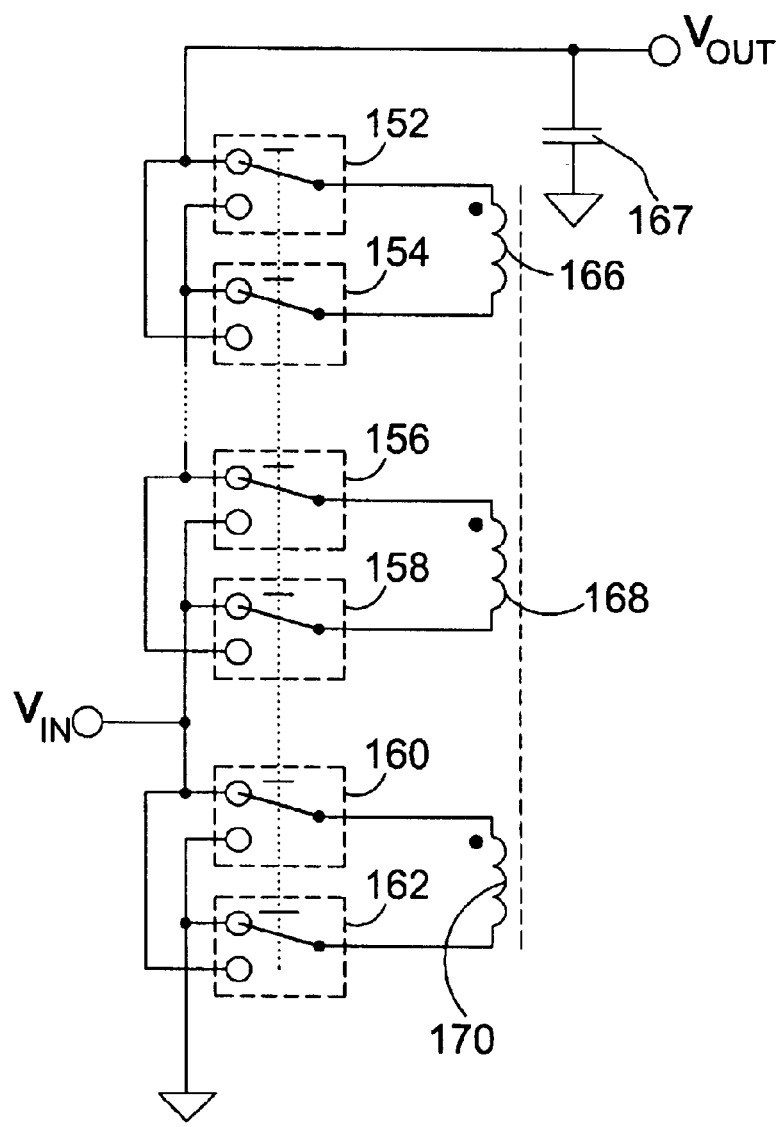
Figure 10B:
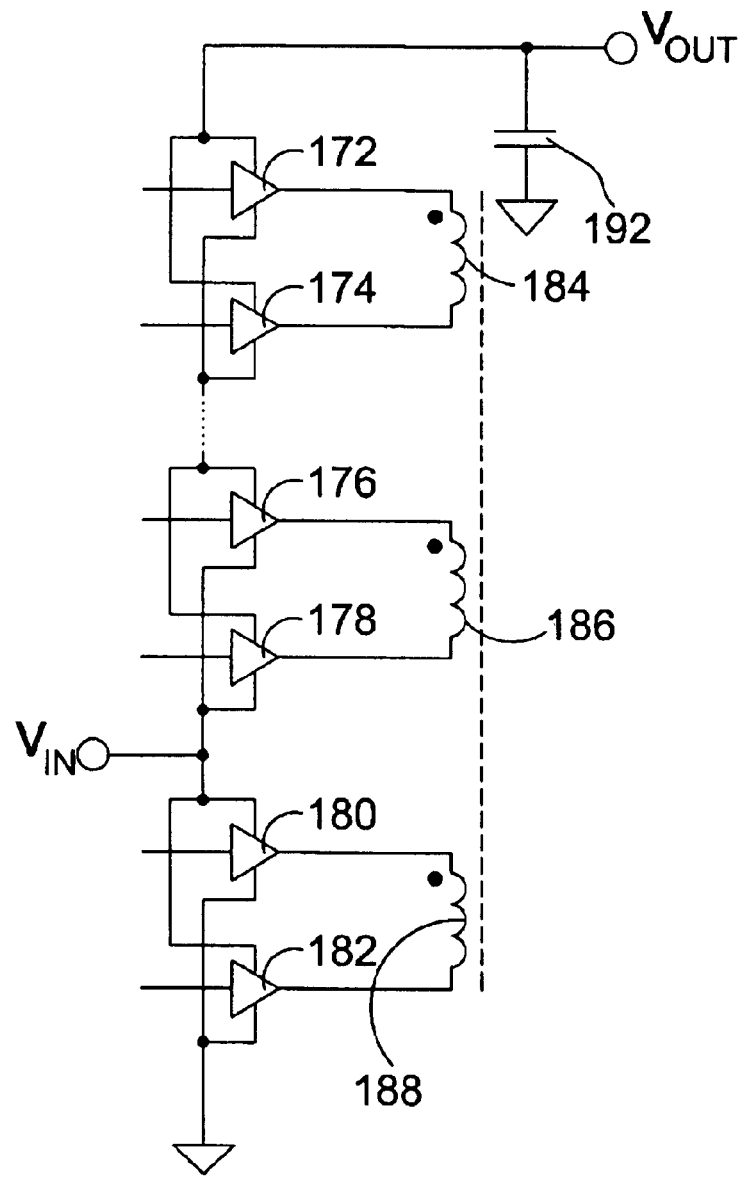

FIGS. 9A and 9B are exemplary illustrations of embodiments where the $V_{out}$ has a greater voltage magnitude than $V_{in}$. Embodiments illustrated in FIGS. 9A and 9B ate similar to the embodiments illustrated in FIGS. 5A and 5B. However, in the embodiments illustrated in FIGS. 9A and 9B, $V_{out}$ may be coupled to first input [109 or 128] and first input [115 or 132]. $V_{in}$ may be coupled to second input [111 or 130], second input [113 or 134], first input [117 or 136], and first input [123 or 140]. FIGS. 10A and 10B are exemplary illustrations of embodiments where $V_{out}$ has a greater magnitude than $V_{in}$. FIGS. 10A and 10B illustrate similar embodiments as illustrated in FIGS. 9A and 9B. However, in these embodiments, more than two independently switched inductors are both electrically and magnetically coupled. In embodiments, $V_{out}$ may be coupled to any of the input terminals of switches or bridges [152, 154, 156, 158, 160, 162, 172, 174, 176, 178, 180, and/or 182]. In embodiments, different voltage outputs may be coupled to different input terminals of switches or bridges [152, 154, 156, 158, 160, 162, 172, 174, 176, 178, 180, and/or 182].

Figure 11A:
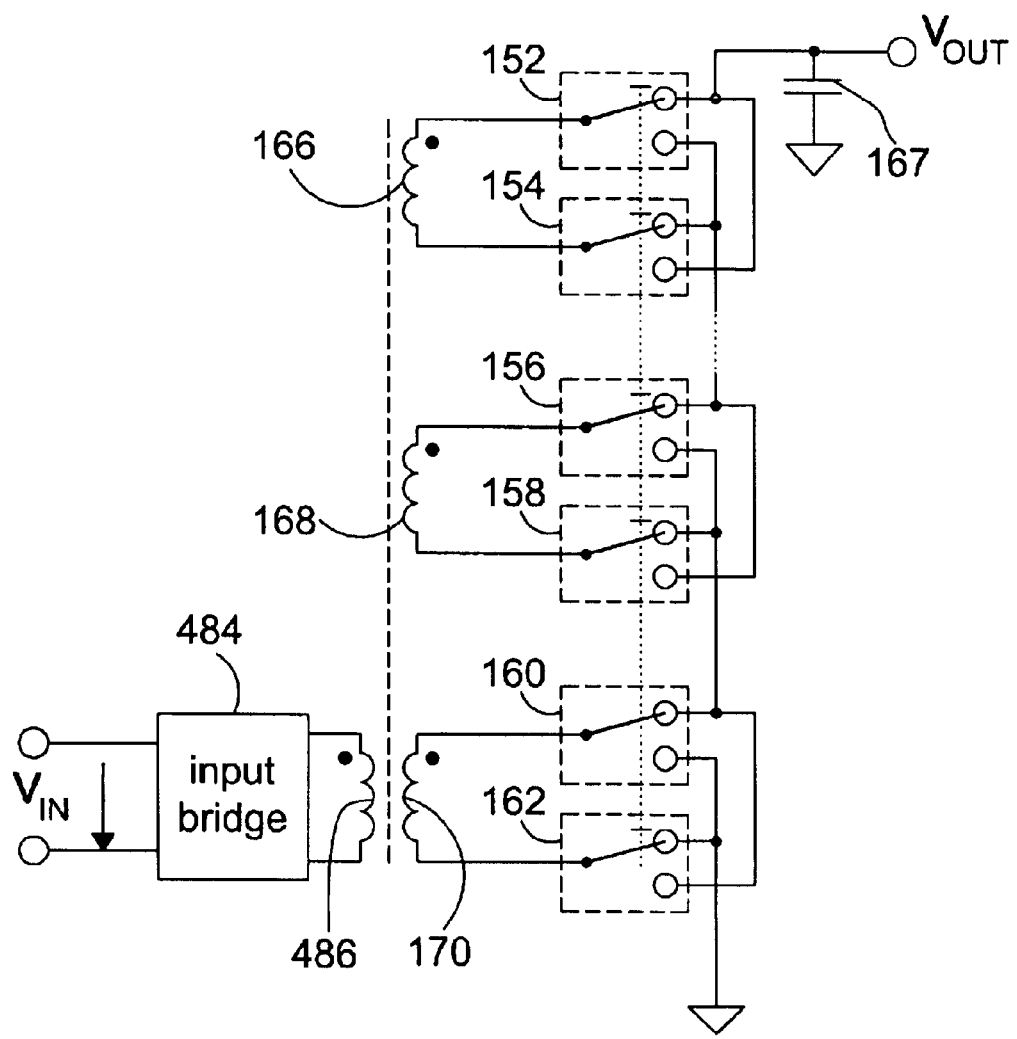
Figure 11B:
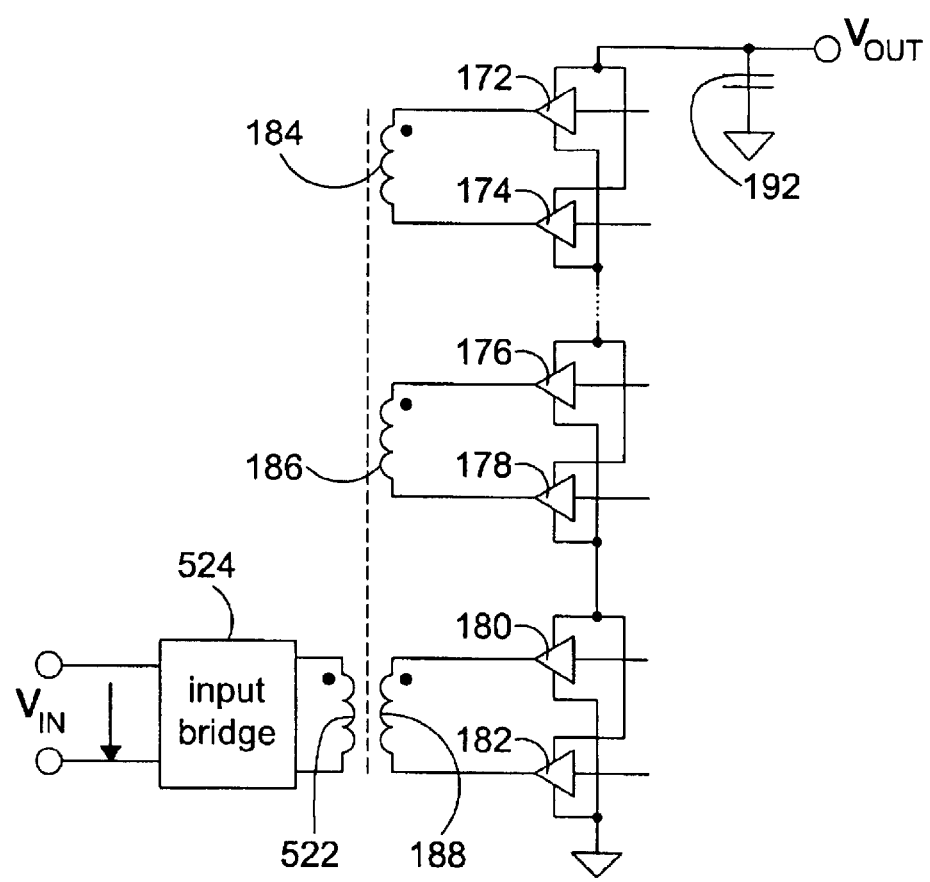

FIGS. 11A and 11B illustrate embodiments similar to embodiments illustrated in FIGS. 10A or 10B, wherein $V_{in}$ may be electrically coupled to an input inductor [486 or 522] through input bridge [484 or 524]. Input inductor 486 may be magnetically coupled to third inductor [170 or 188] In embodiments, $V_{out}$ may be coupled to any of the input terminals of switches or bridges [152, 154, 156, 158, 160, 162, 172, 174, 176, 178, 180, and/or 182]. In embodiments, different voltage outputs may be coupled to different input terminals of switch or bridges [152, 154, 156, 158, 160, 162, 172, 174, 176, 178, 180, and/or 182].

The foregoing embodiments and advantages are merely exemplary and are not to be construed as limiting the present invention. The present teaching can be readily applied to other types of apparatuses. The description of the present invention is intended to be illustrative, and not limit the scope of the claims. Many alternatives, modifications, and variations will be apparent to those skilled in the art.

What is claimed is:

1. An apparatus comprising:
    a first switch to switch between a first terminal and a second terminal, the first switch having an output terminal;

a second switch to switch between the second terminal and the first terminal, the second switch having an output terminal;

a first inductor coupled between the output terminal of the first switch and the output terminal at the second switch;

a third switch to switch between the second terminal and a third terminal, the third switch having an output terminal;

a fourth switch; and a second inductor coupled between the output terminal of the third switch and an output terminal of the fourth switch, the second terminal being different than the first terminal and the third terminal.

2. The apparatus of claim 1, wherein the apparatus is a DC—DC converter.

3. The apparatus of claim 2, wherein:
the DC—DC converter transforms an input voltage to an output voltage; and
the input voltage has a smaller magnitude than the output voltage.

4. The apparatus of claim 2, wherein:
the DC—DC converter transforms an input voltage to an output voltage; and
the input voltage has a larger magnitude than the output voltage.

5. The apparatus of claim 2, wherein:
the DC—DC converter transforms an input voltage to an output voltage; and
the input voltage has substantially the same magnitude as the output voltage.

6. The apparatus of claim 1, wherein at least one of the first switch, the second switch, the third switch, and the fourth switch comprises a transistor.

7. The apparatus of claim 6, wherein the transistor is a metal oxide semiconductor field effect transistor.

8. The apparatus of claim 1, wherein at least one of the first switch, the second switch, the third switch, and the fourth switch is a bridge circuit.

9. The apparatus of claim 1, further comprising:
a third inductor magnetically coupled to the first inductor and the second inductor;
a fifth switch coupled to the third inductor; and
a sixth switch coupled to the third inductor, wherein:
the third inductor is arranged between an output terminal of the fifth switch and an output terminal of the sixth switch.

10. The apparatus of claim 9, wherein:
a ninth input terminal of the fifth switch is coupled to a tenth input terminal of the sixth switch; and
an eleventh input terminal of the fifth switch is coupled to a twelfth input terminal of the sixth switch.

11. The apparatus of claim 10, wherein:
the fifth switch comprises a fifth control terminal arranged to switch between the ninth input terminal and the eleventh input terminal; and
the sixth switch comprises a sixth control terminal arranged to switch between the tenth input terminal and the twelfth input terminal.

12. The apparatus of claim 1, wherein at least one of:
the first switch and the second switch are arranged to be switched substantially in tandem;
the third switch and the fourth switch are arranged to be switched substantially in tandem;

the first switch and the third switch are arranged to be switched substantially in tandem; and
the second switch and the fourth switch are arranged to be switched substantially in tandem.

13. The apparatus of claim 1, wherein at least one of:
the first switch and the second switch are arranged to be periodically switched substantially in tandem;
the third switch and the fourth switch are arranged to be periodically switched substantially in tandem;
the first switch and the third switch are arranged to be periodically switched substantially in tandem; and
the second switch and the fourth switch are arranged to be periodically switched substantially in tandem.

14. The apparatus of claim 1, wherein at least one of:
the first switch and the second switch are arranged to be switched substantially in tandem at a frequency between 1 Hz and 10 GHz;
the third switch and the fourth switch are arranged to be switched substantially in tandem at a frequency between 1 Hz and 10 GHz;
the first switch and the third switch are arranged to be switched substantially in tandem at a frequency between 1 Hz and 10 GHz; and
the second switch and the fourth switch are arranged to be switched substantially in tandem at a frequency between 1 Hz and 10 GHz.

15. The apparatus of claim 1, wherein:
the first input terminal of the first switch is coupled to the second input terminal of the second switch;
the second input terminal of the first switch is coupled to the first input terminal of the second switch;
the first input terminal of the third switch is coupled to the second input terminal of the fourth switch; and
the second input terminal of the third switch is coupled to the first input terminal of the fourth switch.

16. The apparatus of claim 1, wherein at least one of:
a voltage input terminal is coupled to at least one of an input terminal of the first switch, an input terminal of the second switch, an input terminal of the third switch, an input terminal of the fourth switch, the center of the first inductor, and the center of the second inductor; and
a voltage output terminal is coupled to at least one of an input terminal of the first switch, an input terminal of the second switch, an input terminal of the third switch, an input terminal of the fourth switch, the center of the first inductor, and the center of the second inductor.

17. The apparatus of claim 1, wherein:
a voltage input terminal is electrically coupled to an input inductor; and
the input inductor is magnetically coupled to at least one of the first inductor and the second inductor.

18. The apparatus of claim 1, wherein:
a voltage output terminal is electrically coupled to an output inductor;
the output inductor is magnetically coupled to at least one of the first inductor and the second inductor.

19. The apparatus of claim 1, wherein a voltage output terminal is electrically coupled to an output inductor, wherein the output inductor is magnetically coupled to at least one of the first inductor and the second inductor.

20. The apparatus of claim 1, wherein:
a first voltage output terminal is electrically coupled to a first output inductor, wherein the first output inductor is magnetically coupled to at least one of the first inductor and the second inductor, and a second voltage output terminal is electrically coupled to a second output inductor, wherein the second output inductor is magnetically coupled to at least one of the first inductor and the second inductor.

21. The apparatus of claim 1, wherein a voltage input terminal is electrically coupled to an input inductor, wherein the input inductor is magnetically coupled to at least one of the first inductor and the second inductor.

22. The apparatus of claim 1, wherein the first inductor and the second inductor have at least one of:

the same polarity in relation to the magnetic coupling of the first inductor and the second inductor; and the opposite polarity in relation to the magnetic coupling of the first inductor and the second inductor.

23. A system comprising:

a die comprising a processor; and an off-die component in communication with the processor;

wherein the processor comprises:

a first switch to switch between a first terminal and a second terminal, the first switch having an output terminal;

a second switch to switch between the second terminal and the first terminal, the second switch having an output terminal;

a first inductor coupled between the output terminal of the first switch and the output terminal at the second switch;

a third switch to switch between the second terminal and a third terminal, the third switch having an output terminal;

a fourth switch; and a second inductor coupled between the output terminal of the third switch and an output terminal of the fourth switch, the second terminal being different than the first terminal and the third terminal.

24. The system of claim 23, wherein the off-die component is at least one of a cache memory, a chip set, and a graphical interface.

25. The apparatus of claim 1, wherein the first terminal corresponds to an input voltage potential and the third terminal corresponds to a GROUND potential.

26. The apparatus of claim 25, wherein the second terminal corresponds to an output voltage potential.

27. The apparatus of claim 25, wherein the second terminal corresponds to an intermediate potential between the input voltage potential and the GROUND potential.

28. The apparatus of claim 1, wherein the second terminal corresponds to a non-GROUND potential and also corresponds to a non-input voltage potential.

29. A DC—DC converter having an input terminal and an output terminal, comprising:

a first node;

a second node;

a third node at a different potential than the first node and the second node;

a first switch to switch between the first node and the second node;

a second switch to switch between the second node and the first node;

a third switch to switch between the second node and the third node;

a fourth switch to switch between the third node and the second node;

a first inductor coupled between an output node of the first switch and an output node of the second switch; and a second inductor coupled between an output node of the third switch and an output node of the fourth switch.

30. The DC—DC converter of claim 29, wherein the second node is at a different potential than the first node.

31. The DC—DC converter of claim 29, wherein the first inductor and the second inductor are magnetically and electrically coupled.

32. The DC—DC converter of claim 29, further comprising:

a third inductor magnetically coupled to the first inductor and the second inductor;

a fifth switch coupled to the third inductor; and a sixth switch coupled to the third inductor, wherein:
the third inductor is arranged between an output terminal of the fifth switch and an output terminal of the sixth switch.

33. The DC—DC converter of claim 29, wherein the first node corresponds to an input voltage potential and the third node corresponds to a GROUND potential.

34. The DC—DC converter of claim 33, wherein the second node corresponds to an output voltage potential.

35. The DC—DC converter of claim 33, wherein the second node corresponds to an intermediate potential between the input voltage potential and the GROUND potential.

36. The DC—DC converter of claim 29, wherein the second node corresponds to a non-GROUND potential and also corresponds to a non-input voltage potential.

* * * * *